US010082441B2

(12) United States Patent
Mateo

(10) Patent No.: US 10,082,441 B2
(45) Date of Patent: Sep. 25, 2018

(54) DEVICE FOR CHECKING A PRESSURIZED TESTING TOOL FOR A FLUID CIRCUIT OF AN AIRCRAFT

(71) Applicant: Airbus Operations SAS, Toulouse (FR)

(72) Inventor: Stéphane Mateo, Dieupentale (FR)

(73) Assignee: Airbus Operations SAS (FR)

(*) Notice: Subject to any disclaimer, the term of this patent is extended or adjusted under 35 U.S.C. 154(b) by 204 days.

(21) Appl. No.: 14/962,834

(22) Filed: Dec. 8, 2015

(65) Prior Publication Data

US 2016/0161360 A1    Jun. 9, 2016

(30) Foreign Application Priority Data

Dec. 8, 2014  (FR) ..................... 14 62028

(51) Int. Cl.
*G01M 3/32*   (2006.01)
*G01M 3/00*   (2006.01)
*G01M 3/26*   (2006.01)
*G01M 13/00*  (2006.01)
*B64F 5/60*   (2017.01)

(52) U.S. Cl.
CPC ................ *G01M 3/32* (2013.01); *B64F 5/60* (2017.01); *G01M 3/007* (2013.01); *G01M 3/26* (2013.01); *G01M 13/00* (2013.01)

(58) Field of Classification Search
CPC .......... G01M 3/007; G01M 3/26; G01M 3/32; G01M 13/00; B64F 5/00; B64F 5/10; B64F 5/60; F15B 19/00; F15B 19/002; F15B 19/005

USPC ............... 73/1.57, 37, 40.5 R, 49.8, 865.9
See application file for complete search history.

(56) References Cited

U.S. PATENT DOCUMENTS

| 2,364,709 A * | 12/1944 | Greer ................ F15B 19/005 73/168 |
| 6,532,800 B1 * | 3/2003 | Boeckstiegel ...... G01M 3/3236 73/40.5 R |
| 2005/0126265 A1 * | 6/2005 | Herzog .............. G01M 3/3236 73/49.2 |
| 2013/0192345 A1 | 8/2013 | Mateo et al. |
| 2014/0053636 A1 | 2/2014 | Ghosh et al. |

FOREIGN PATENT DOCUMENTS

FR   2965052 A1   3/2012

OTHER PUBLICATIONS

French Search Report (dated Jul. 24, 2015) (FR 1462028).

* cited by examiner

*Primary Examiner* — Benjamin Schmitt
(74) *Attorney, Agent, or Firm* — Lerner, David, Littenberg, Krumholz & Mentlik, LLP

(57) ABSTRACT

A device for checking at least one pressurized testing tool for a fluid circuit of an aircraft includes at least one tank that includes at least one connection to connect a pressurized gas supply and at least one connection system arranged to connect at least one pressurized testing tool. This device makes it possible to perform preventive checks on pressurized testing tools without having to immobilize an aeroplane on an assembly line.

16 Claims, 5 Drawing Sheets

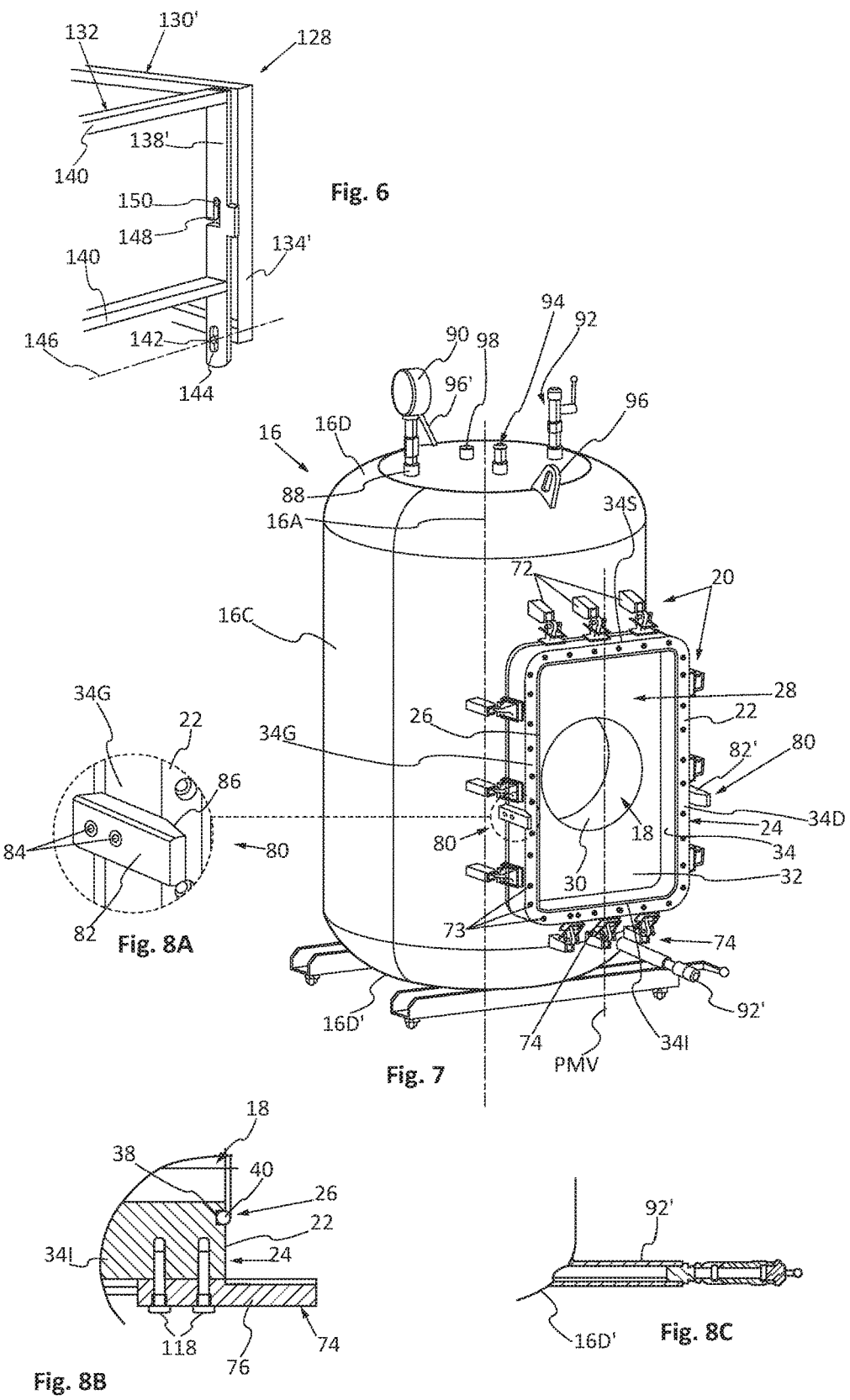

DEVICE FOR CHECKING A PRESSURIZED TESTING TOOL FOR A FLUID CIRCUIT OF AN AIRCRAFT

FIELD OF THE INVENTION

The invention relates to a device for checking a pressurized testing tool for a fluid circuit of an aircraft.

BACKGROUND OF THE INVENTION

An aircraft has numerous fluid tanks and/or circuits with closing devices (such as doors, shutters, etc.), connection devices (such as connections, sockets, etc.), pressure control systems (such as reducing valves, safety valves, pressure gauges, etc.), flow management systems (such as valves, gates, etc.) that need to be checked when assembling the aircraft.

For the present patent application, a fluid circuit shall mean one or more fluid circuits, at least one section or at least one element of a fluid circuit, at least one fluid tank or a combination of these different elements.

Pressurized testing tools have been developed to test this fluid circuit. These testing tools can be more or less complex.

By way of example, document FR-2.965.052 describes a test bench used to test different circuits with different gases at different pressures.

According to one operating mode, the test carried out on a fluid circuit is dynamic and lasts for a given duration. This is in particular the case for tests carried out on tanks in aeroplanes to check the sealing of same.

As with all measurement instruments, pressurized testing tools need to be checked periodically and preventively to ensure they are compliant.

According to a checking method in the prior art, the pressurized testing tools are checked under real conditions using the fluid circuits of an aeroplane on an assembly line. This checking method requires the aeroplane to be immobilized on the assembly line for a given duration. In the case, for example, of testing tools that require the pressurization of voluminous tanks or the performance of a cycle of measurements, the immobilization time may be quite long and have an impact on the production time of the aeroplanes.

On account of manufacturing cycles, aeroplanes on an assembly line are rarely available to carry out such checks on testing tools.

Consequently, it is difficult to carry out preventive checks of pressurized testing tools for the fluid circuits of an aeroplane.

BRIEF SUMMARY OF THE INVENTION

The present invention is intended to address the drawbacks in the prior art.

For this purpose, the invention relates to a device for checking at least one pressurized testing tool for a fluid circuit of an aircraft, characterized in that it includes at least one tank that includes at least one connection to connect a pressurized gas supply and at least one connection system arranged to connect at least one pressurized testing tool. This device makes it possible to perform preventive checks on pressurized testing tools without having to immobilize an aeroplane on an assembly line.

Advantageously, at least one tank is a vat with a capacity equal to or greater than 200 L. In this arrangement, the vat has sufficient capacity to simulate a tank of an aircraft. This makes it possible to test the testing tools dynamically without having to monopolize an aeroplane.

Preferably, the connection system includes at least one opening enabling communication between the inside and the outside of the vat and a joining system designed to hold a closing element in a position in which it closes the opening.

According to another feature, the device includes an interface that includes a wall traversed by a window the shape of which is adapted to the shape of the testing tool to be checked, said wall having an internal face with a peripheral bearing surface designed to cooperate with a bearing surface of the opening. In this arrangement, it is possible to use a single opening to check different testing tools, even if they are of different shapes. This means that the interface fits the testing tool to be checked.

According to one embodiment, the connection system includes:
  an outer chamber delimited by a back and a peripheral wall that has an edge corresponding to the bearing surface of the opening, and
  a conduit for communicating the outer chamber with the inside of the vat.

Advantageously, the device includes centering means to facilitate the positioning of an interface or of a door in relation to the opening.

According to another feature, the device includes at least two vats each having a connection and a connection pipe designed to link (or otherwise) the two connections and to communicate the two vats. This arrangement makes the checking device more adjustable.

Preferably, the device includes a false door to close the opening. This false door is normally used to close the opening of a first vat when two vats are linked and only one testing tool is being checked on the second vat.

According to another feature, at least one tank is a line. This line makes it possible to simulate a fluid conduit of an aircraft. Preferably, the internal diameter of the line is between 40 and 100 mm and/or the length of same is between 3 and 10 m.

Advantageously, the line includes a reducing valve linked to the connection for connecting a pressurized gas supply.

According to another feature, the device includes a moveable chassis carrying the tank or tanks.

Preferably, the moveable chassis includes a frame moveable between a blocking position in which at least one portion of the moveable frame is arranged opposite the connection system designed to connect at least one pressurized testing tool and a released position in which the moveable frame releases said connection system and enables placement of an interface, a false door, a pressurized testing tool, or any other closing element. This arrangement increases the safety of the device, the moveable frame being able to hold the interface, the false door, the pressurized testing tool or any other closing element in the event of ejection caused by overpressure.

According to one embodiment, the moveable frame includes two uprights each having an aperture in which is seated a pivot axis carried by a static frame, at least one of the uprights having a hook designed to cooperate with a pin rigidly connected to a static frame in the blocking position.

Preferably, the moveable chassis includes a moveable shelf positioned beneath a line acting as a tank.

Advantageously, the moveable chassis includes a structure that surrounds at least one tank in the form of a vat, a portion of which forms a supporting element to which a tank in the form of a line is attached.

According to other features, the supporting element is arranged vertically so that the line is arranged in a vertical plane and the line follows an S-shaped path.

BRIEF DESCRIPTION OF THE DRAWINGS

Other features and advantages are set out in the description of the invention below, given purely by way of example and with reference to the attached drawings, in which:

FIG. 6 is a perspective view showing a detail of FIG. 5, FIG. 7 is a perspective view of a vat of a checking device showing one embodiment of the invention, FIG. 8A is a perspective view of a first detail of FIG. 7 showing means for guiding a door or an interface, FIG. 8B is a cross section of a second detail of FIG. 7 showing means for holding a door or an interface, FIG. 8C is a cross section of a third detail of FIG. 7 showing a bleeder valve.

DETAILED DESCRIPTION

In FIGS. 1 to 4, reference sign 10 indicates a checking device used to check the conformity of at least one testing tool.

Figure 2:
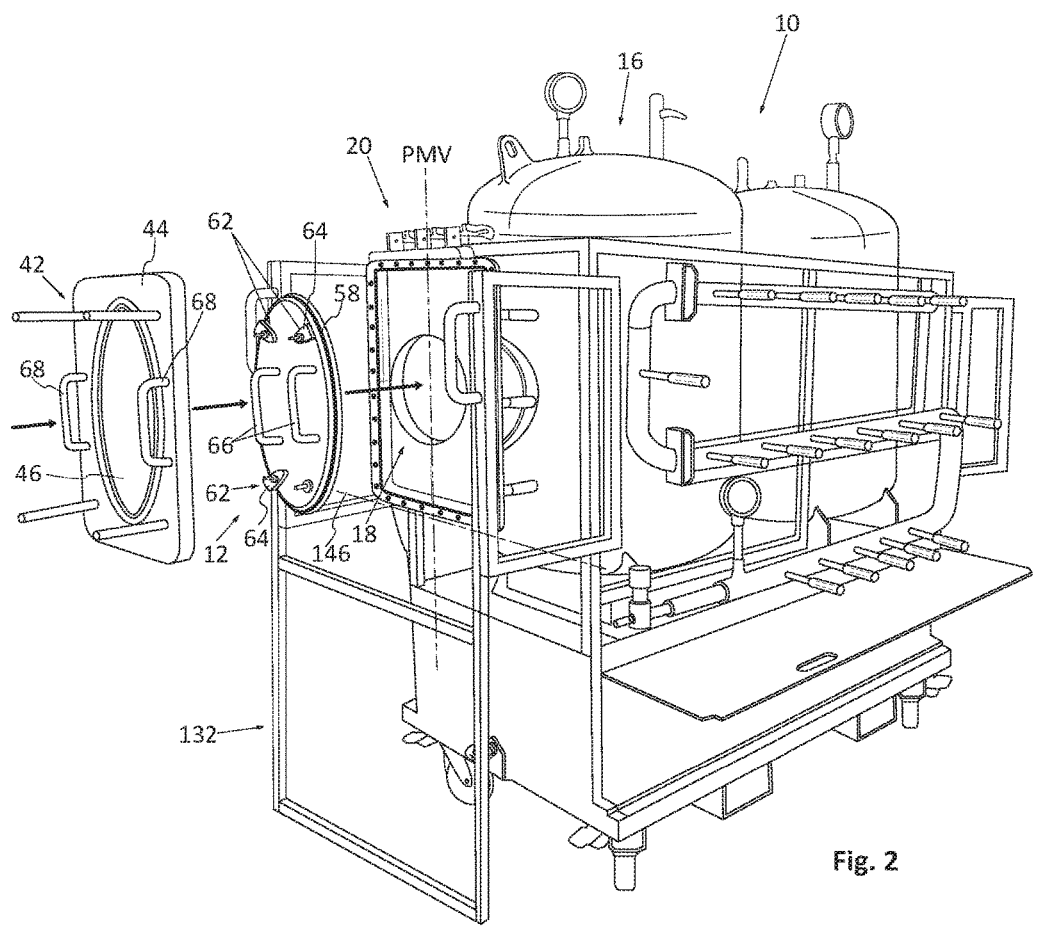
FIG. 2 is a perspective view of the checking device in FIG. 1, during assembly of a pressurized testing tool.
Figure 4:
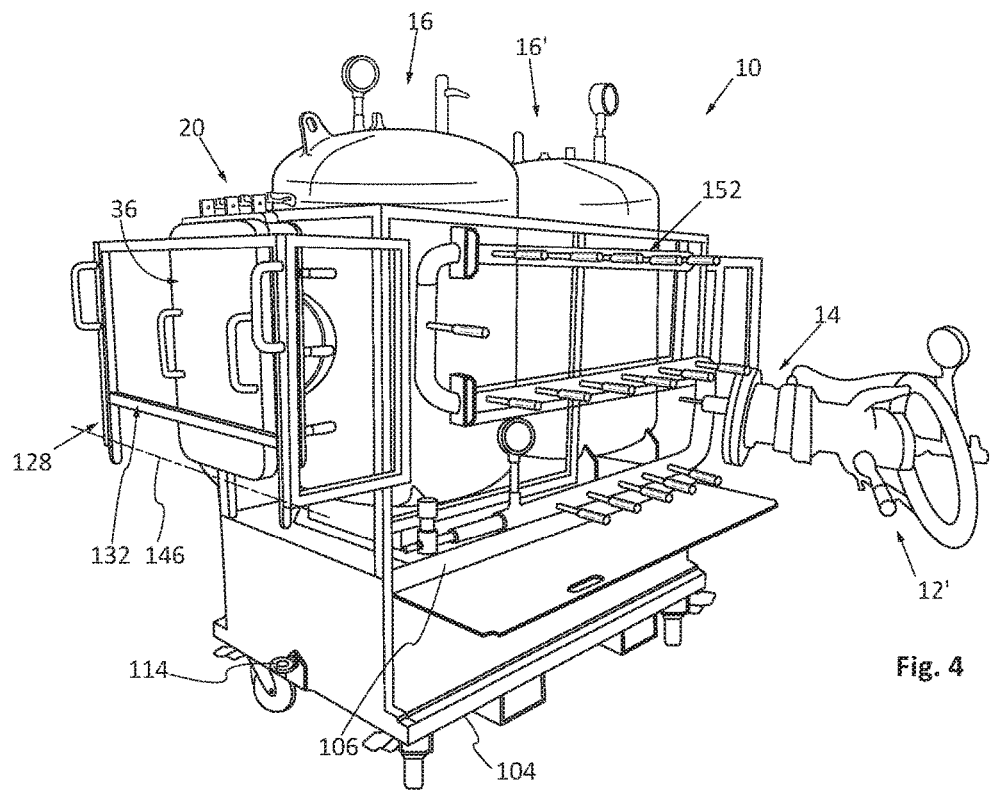
FIG. 4 is a perspective view of the checking device in FIG. 1, when another testing tool is being checked.

In FIG. 2, the testing tool is an instrumented door 12. In FIG. 4, the testing tool is an adaptor 12' fitted with a connection interface 14.

Naturally, the invention is not limited to these testing tools. It may be used for any pressurized testing tools used to check the conformity of a fluid circuit of an aircraft.

According to one embodiment, a checking device 10 includes at least one vat 16 and at least one connection system to connect at least one testing tool to the vat 16. Preferably, this connection system includes at least one opening 18 enabling communication between the inside and the outside of the vat 16 and a joining system 20 designed to hold a closing element in a position in which it closes the opening 18. A closing element may be a testing tool, an interface carrying a testing tool, a false door or any other closing element.

This joining system 20 is more specifically designed to hold an instrumented door 12.

According to a first feature of the invention, the vat 16 has a capacity equal to or greater than 200 L. Below this value, the vat 16 would not have sufficient capacity to simulate a tank and would not enable testing of testing tools designed for dynamic tests on at least one aeroplane tank.

Preferably, the vat 16 has a capacity of around 350 L. This capacity represents a good compromise between the volume occupied by the checking device, which needs to be as small as possible, and the capacity of the vat, which needs to be as large as possible to ensure optimum reliability of the simulation of a tank of an aeroplane, the capacity of which may be as much as several thousands of liters.

According to an embodiment illustrated in detail in FIG. 7, a vat 16 includes a central cylindrical portion 16C closed at each extremity by a dome 16D and 16D'. According to one arrangement, the vat 16 is positioned such that the axis 16A of the central cylindrical portion 16C is vertical.

As shown in detail in FIG. 7, the opening 18 is delimited by a frame 22 that provides a substantially flat bearing surface 24 with sealing means 26 extending around the entire periphery of the frame 22.

Advantageously, the vat 16 includes an outer chamber 28 that communicates with the inside of the vat 16 via a conduit 30. The diameter of this conduit is equal to or greater than 200 mm.

According to an embodiment shown in FIG. 7, the outer chamber 28 includes a back 32 and a peripheral wall 34 that has a first extremity linked to the back 32 and a second extremity that forms the frame 22. Thus, the second extremity of the peripheral wall 34 includes an edge that corresponds to the bearing surface 24.

According to one arrangement, the bearing surface 24 and the back 32 are arranged in vertical planes and the axis of the conduit 30 is horizontal.

According to one arrangement, the opening 18 has a rectangular section with rounded vertices. According to this arrangement, the peripheral wall 34 has a rectangular section similar to the rectangular section of the opening 18. Thus, the peripheral wall 34 has a horizontal lower small side 34I, a horizontal upper small side 34S, a right-hand large side 34D and a left-hand large side 34G.

The checking device 10 includes a false door 36 (shown in FIG. 4) for closing the opening 18 when no tool is positioned in the opening 18.

According to an embodiment shown in FIGS. 7 and 8B, the sealing means 26 include a peripheral groove 38 on the bearing surface 24 that surrounds the opening 18 and a peripheral gasket 40 seated in the peripheral groove 38.

Figure 9:
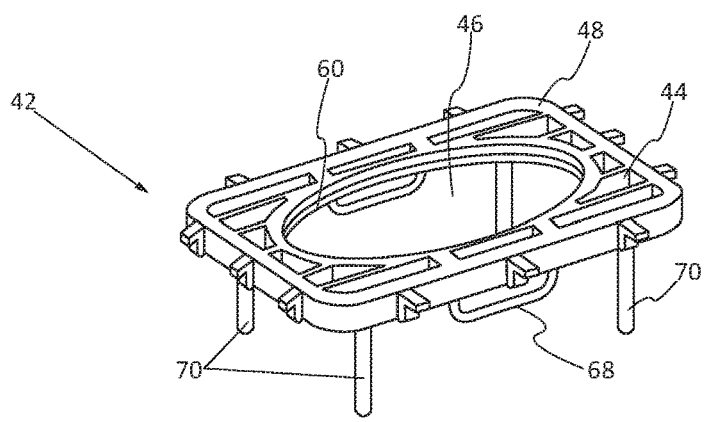
FIG. 9 is a perspective view of an interface used to link a testing tool to a vat of a checking device.

Preferably, the checking device 10 includes an interface 42 (shown in FIGS. 1, 2 and 9) used to position an instrumented door 12 or any other closing testing tool in the opening 18. This interface 42 (shown in detail in FIGS. 2 and 9) includes a wall 44 traversed by a window 46, the shape of which matches the shape of the testing tool to be check, for example the instrumented door 12. The wall 44 includes an internal face with a peripheral bearing surface 48 that cooperates with the bearing surface 24 of the opening 18.

According to an embodiment shown in FIG. 2, the instrumented door 12 has a peripheral bearing surface 58 around the outer surface of same and a peripheral gasket positioned on the bearing surface 58 that extends around the entire periphery of the instrumented door 12. The interface 42 has, on the internal face of same and surrounding the entire window 46, a bearing surface 60 (shown in FIG. 9) designed to cooperate sealingly with the bearing surface 58 of the instrumented door 12. A clamping system 62 is used to create a non-permanent connection between the instrumented door 12 and the interface 42. According to an embodiment shown in FIG. 2, the clamping system 62 includes flanges 64 arranged to press the bearing surface 58 of the instrumented door 12 against the bearing surface 60 of the interface 42.

As shown in FIG. 2, the instrumented door 12 has at least one handle 66 used to handle same. Preferably, the interface 42 has at least one handle 68 used to handle same.

Advantageously, the interface 42 has feet 70 (shown in FIG. 9) used to raise same in order to facilitate the positioning of the instrumented door 12 or any other means for closing the window 46 of the interface 42.

According to one embodiment, the joining system 20 has a plurality of flanges arranged around the periphery of the opening 18. As shown in FIG. 7, in the case of a rectangular opening, the joining system 20 has three lever clasps 72 (shown in FIG. 7) on each side of the opening 18. The invention is not limited to this joining system. Thus, the bearing surface 24 includes a plurality of threaded holes 73 distributed about the opening 18, outside the peripheral groove 38 containing the gasket 40, these threaded holes 73 being usable to attach an interface using screws.

Preferably, the checking device 10 includes means 74 for holding a door or an interface, as shown in FIG. 8B. According to one embodiment, the holding means 74 include at least one bracket 76, a portion of which projects beyond the bearing surface 24 of the opening 18, said bracket 76 being positioned at the lowest point of said opening 18. In the case of an opening 18 with a rectangular section, the checking device includes two brackets 76 attached by screws 78 (shown in FIG. 8B) on the outer surface of the lower small side 34I of the peripheral wall 34. These two brackets 76 are arranged symmetrically about a vertical midplane PMV positioned equidistantly between the right-hand and left-hand large sides 34D, 34G.

Preferably, the checking device 10 includes means 80 for guiding a door or an interface, as shown in FIG. 8A. According to one embodiment, in the case of an opening 18 with a rectangular section, the checking device includes two wedges 82, 82', a first wedge 82 attached by screws 84 to the outer surface of the left-hand large side 34G of the peripheral wall 34 and a second wedge 82' attached by screws to the outer surface of the right-hand large side 34D of the peripheral wall 34.

Preferably, the wedges 82, 82' include bevelled faces 86 (shown in FIG. 8A) oriented to face one another to facilitate insertion of an interface 42 or a door between the two wedges 82, 82'.

The holding means 74 and guiding means 80 form the centering means used to facilitate positioning of the interface 42 or the door in relation to the opening 18. Naturally, the invention is not limited to these means for correctly positioning an interface or a door in relation to the opening 18.

According to an embodiment shown in FIG. 7, the vat 16 has a first connection 88 for connecting the vat 16 to a conduit or to any other appliance, such as a pressure sensor 90, at least one bleeder valve 92 and at least one protection valve 94. Preferably, the vat 16 has a first bleeder valve 92 located on the upper portion of the vat and a second bleeder valve 92' located on the lower portion of the vat, as shown in FIG. 8C. These bleeder valves may be fitted with an exhaust silencer.

The first connection 88 is used to connect the vat 16 to a pressurized gas supply in order to fill the vat with a given gas at a given pressure.

Furthermore, the upper portion of the vat 16 has at least one hoisting eye, and preferably to hoisting eyes 96, 96' (shown in FIG. 7).

According to another feature of the invention, the checking device 10 includes two vats 16, 16'. Preferably, the two vats 16, 16' are identical and arranged vertically side-by-side. Each one has an opening 18, said openings being arranged opposite one another.

Figure 3:
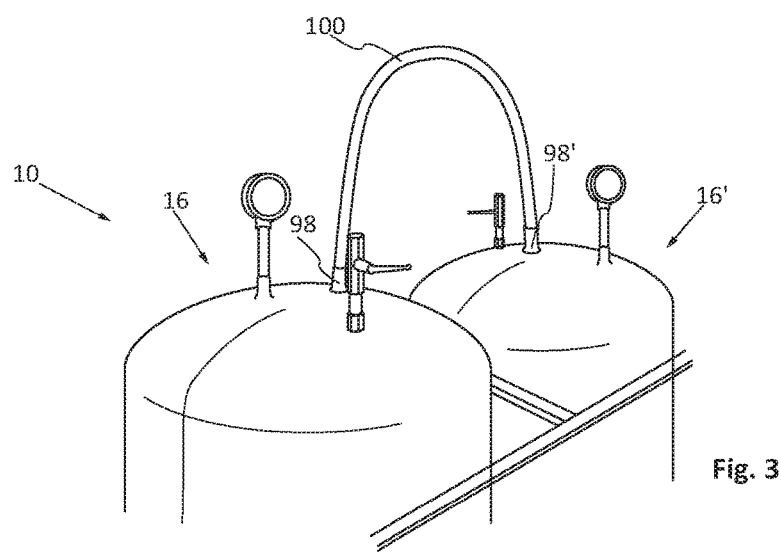
FIG. 3 is a perspective top view of the checking device, showing one arrangement.

Advantageously, as shown in FIG. 3, the two vats 16, 16' include connections 98, 98' to link same together and the checking device 10 has a connection pipe 100 designed to be linked to the connections 98 and 98', thereby communicating the two vats 16, 16'.

This arrangement makes the checking device 10 more adjustable. This enables it to check:

two testing tools simultaneously and separately from one another, if the two vats 16, 16' are not linked by the connection pipe 100 and a testing tool is mounted on each vat 16, 16', two testing tools simultaneously and in coordination, if the two vats 16, 16' are linked by the connection pipe 100 and a testing tool is mounted on each vat, one testing tool with a gas volume corresponding to two vats 16 and 16', if the two vats 16, 16' are linked by the connection pipe 100 and the testing tool is mounted on a vat 16, the opening 18 of the other vat 16' being closed by a false door 36.

Naturally, the invention is not limited to two vats. As such, the checking device may have more than two vats. However, a checking device with two vats represents a compromise between modularity and encumbrance.

Figure 5:
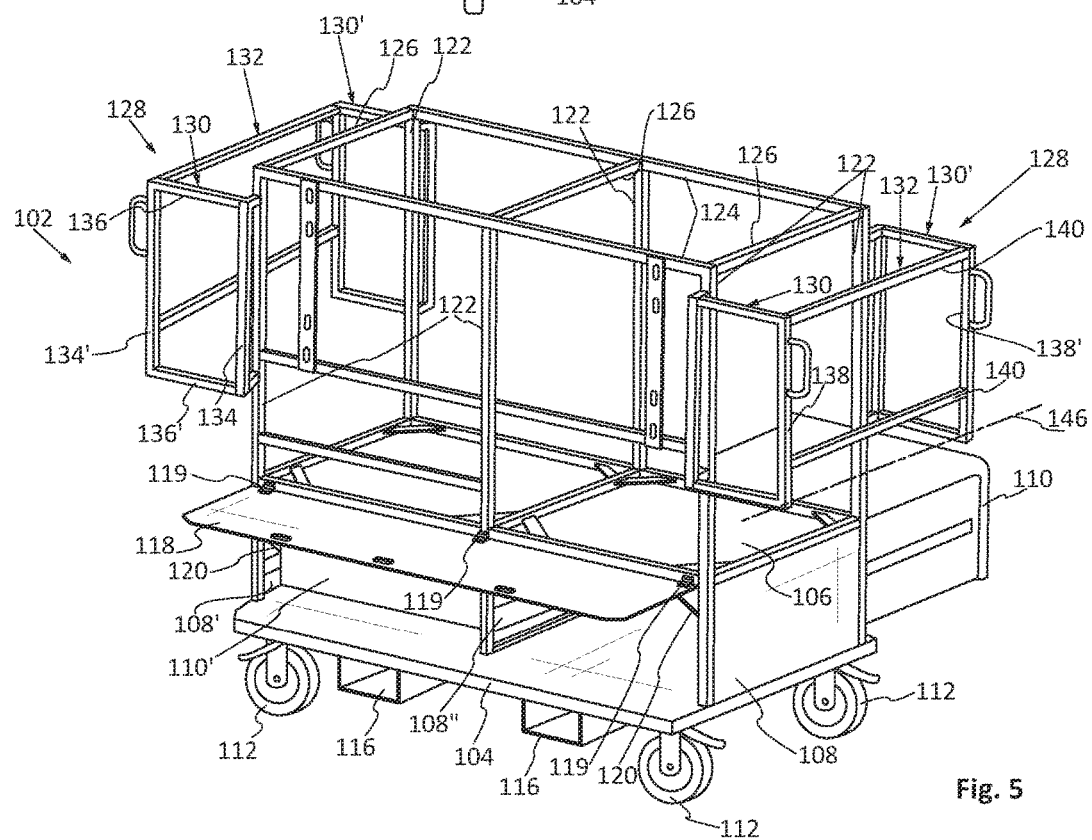
FIG. 5 is a perspective view of a moveable chassis of a checking device showing one embodiment of the invention.

According to another feature, the checking device includes a moveable chassis 102 carrying at least one vat 16, shown in detail in FIG. 5.

According to one embodiment, the moveable chassis 102 has a parallelepiped-shaped lower portion that includes A lower tray 104 and a rectangular upper tray 106, that are linked by vertical partitions 108, 108', 108" that are parallel to one another, two partitions 108 and 108' being arranged on the small sides of the lower and upper trays 104, 106, and a third partition 108" being positioned equidistantly between the two other partitions 108 and 108'.

Advantageously, the checking device 10 has two draws 110 and 110' that are positioned between the two trays 104 and 106, a first draw 110 between the partitions 108 and 108" and a second draw 110' between the partitions 108' and 108". These draws 110 and 110' are notably used to store removable elements of the checking device, such as the connection pipe 100 and interfaces 14 (shown in FIG. 12).

The moveable chassis 102 has four wheels 112 positioned and attached beneath the lower tray 104. According to one arrangement, two wheels are static and two wheels are orientable.

Preferably, the moveable chassis 102 has at least one ring 114 (shown in FIG. 4) positioned on the external face of one of the two partitions 108, 108'.

As a variant or in addition to the wheels 112, the moveable chassis 102 has two slots 116 positioned and attached beneath the lower tray 104 to enable the moveable chassis 102 to be handled and moved using a forklift truck.

Advantageously, the checking device 10 includes a shelf 118 that is moveable between a horizontal position as an extension of the upper tray 106 and a stowed position that is approximately vertical. According to one embodiment, the shelf 118 is rectangular and approximately as long as the upper tray 106. This shelf 118 is linked to the upper tray 106 by at least two hinges 119 that link a large side of the upper tray 106 and a large side of the shelf 118. A system of articulated side-pieces 120 holds the shelf 118 in a horizontal position.

Preferably, the moveable chassis 102 has a mechanically welded structure arranged above the upper tray 106 to hold the vat or vats. This structure includes six uprights 122 arranged at each vertex and in the middle of the large sides of the upper tray 106, two spars 124 that link the upper extremities of the uprights 122 and that are arranged directly above the large sides of the upper tray 106 and three cross members 126 that link pairs of upper extremities of the uprights 122 and that are arranged perpendicular to the spars 124.

The dimensions of the moveable chassis 102 are adapted to the dimensions of the vats 16 and 16' such that the spars 124 and the cross members 126 are tangential to the outer surface of the central cylindrical portion 16C of the vats, the height of the uprights 122 being such that the spars 124 and the cross members 126 are positioned just beneath the upper dome 16D.

According to this arrangement, the gap between the spars 124 or the gap between two cross members 126 is equal to the external diameter of each vat 16, 16'.

Advantageously, the mechanically welded structure includes, for each opening 18 of each vat, a protective cage 128 to prevent any accidental projection during a test of an interface 42, a false door 36 or any other element positioned in the opening 18.

According to an embodiment shown in FIGS. 1, 2, 5 and 6, each protective cage 128 has two static frames 130 and 130' arranged as extensions of the spars 124 and a moveable frame 132. According to one embodiment, each static frame 130, 130' has two uprights 134, 134' linked by cross members 136, 136', one of the uprights 134 being positioned beside an upright 122 of the structure, as shown in FIG. 5. The moveable frame 132 (shown in FIGS. 5 and 6) has two uprights 138 and 138' linked by at least one substantially horizontal cross member 140. In the embodiment shown in FIGS. 1, 2, 5 and 6, the moveable frame 132 has two parallel cross members 140. The moveable frame 132 is linked to the static frames 130, 130' by a joint that enables same to occupy a blocking position (shown in FIGS. 1, 4 and 5) in which at least one portion of the moveable frame 132 is arranged opposite the opening 18 and a released position (shown in FIG. 2) in which the moveable frame 132 releases the opening 18 and enables an interface 42, a false door 36 or any other element to be positioned in the opening 18.

According to an embodiment shown in detail in FIG. 6, the joint includes, for each upright 138, 138' of the moveable frame 132, a pivot axis pin 142 that is rigidly connected to an upright 134' of each static frame 130, 130' and that is seated in an aperture 144 formed in the upright 138, 138'. As such, the moveable frame 132 can pivot about a substantially horizontal axis of rotation 146 formed by the pivot axis 142 to move from the blocking position to the released position.

Each protective cage includes a locking system to keep the moveable frame 132 in the blocking position. According to an embodiment shown in detail in FIG. 6, at least one of the uprights 138, 138' has a hook 148 designed to cooperate with a pin 150 rigidly connected to an upright 134 of a static frame 130, 130' in the blocking position. Advantageously, the two uprights 138, 138' include hooks 148 that cooperate with the pins 150 rigidly connected to the uprights 134, 134' of the static frames 130, 130'.

To move the moveable frame 132 from the blocking position to the released position, the moveable frame 132 is raised to disengage the hooks 148 from the pins 150. The length of the apertures 144 is adjusted to enable the moveable frame 132 to be raised to a sufficient height to enable the hooks 148 to be disengaged from the related pins 150. The moveable frame 132 then pivots about the axis of rotation 146 to the released position.

To move the moveable frame 132 from the released position to the blocking position, the moveable frame 132 pivots about the axis of rotation 146 to a position close to the blocking position. The moveable frame 132 is slightly raised to insert the pins 150 in the hooks 148. This raising is combined with a slight rotational movement to the blocking position. Finally, the moveable frame 132 moves downwards until the hooks 148 are supported by the pins 150 in order to hold the moveable frame 132 in the blocking position.

Naturally, other solutions are possible for the articulation and the locking system of the moveable frame 132.

Figure 1:
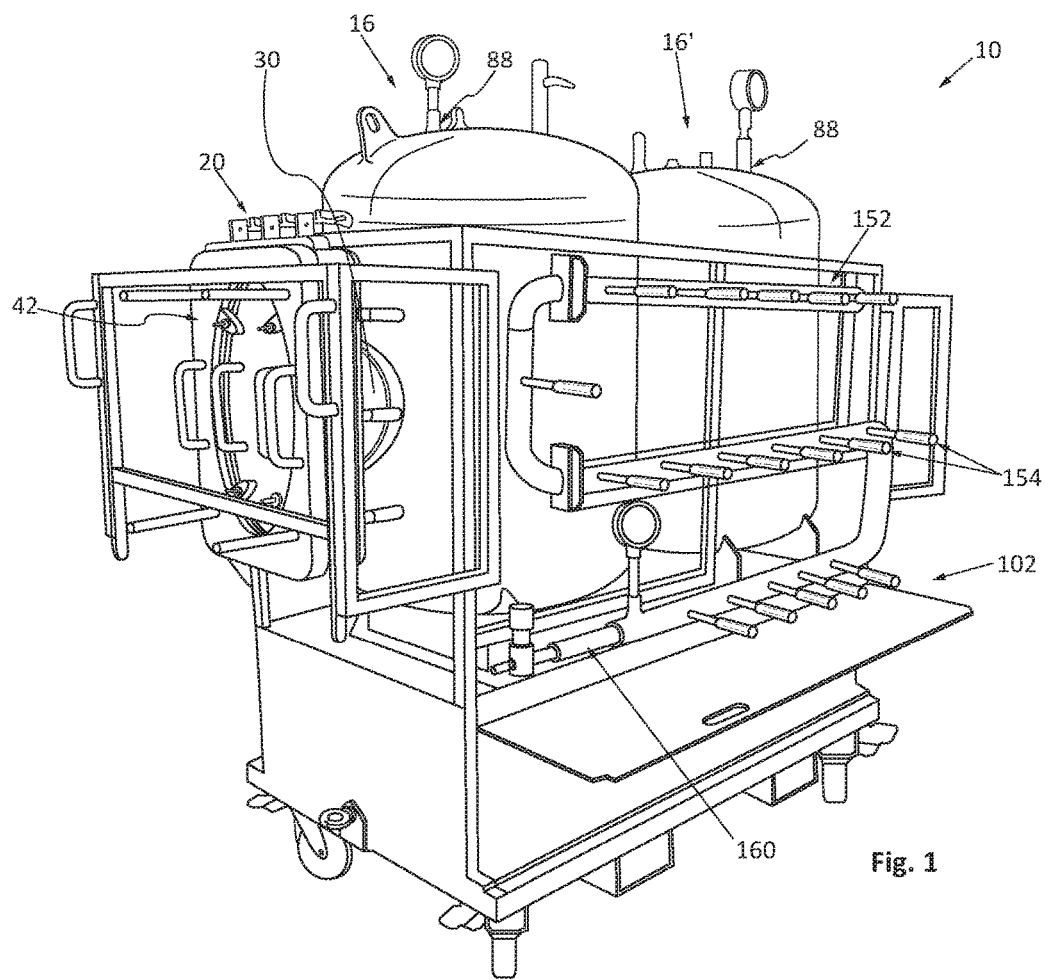
FIG. 1 is a perspective view of a checking device that shows an embodiment of the invention when checking a pressurized testing tool.
Figure 10:
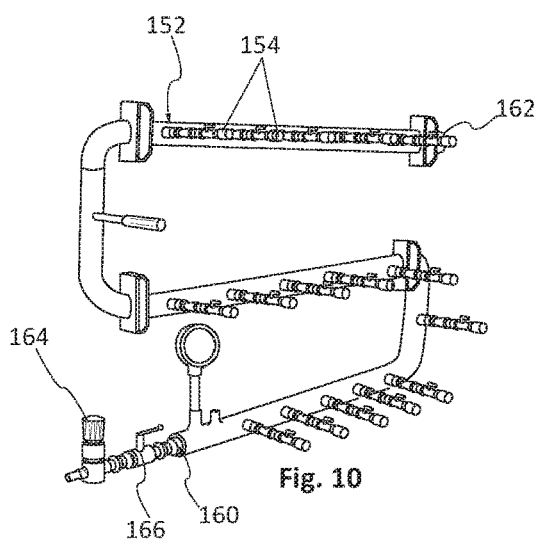
FIG. 10 is a perspective view of a line of a checking device showing one embodiment of the invention.

The checking device includes at least one line 152 acting as tank to check at least one testing tool of a line of an aircraft, shown in FIGS. 1, 4 and 10.

To simulate a line of an aircraft, the line 152 has an internal diameter of between 40 and 100 mm. Preferably, the line 152 has an internal diameter of around 70 mm.

To improve the simulation, the length of the line 152 is between 3 and 10 m. Preferably, the line 152 is around 5 m long.

This line 152 includes at least one connection system 154 to connect a testing tool to be checked. According to an embodiment shown in detail in FIG. 11B, each connection system 154 is a quick-connect socket and, for each connection system 154, the line 152 includes a branch 156 that extends perpendicular to the line 152 and an isolation valve 158 positioned between the branch 156 and the quick-connect socket.

Figure 11A:
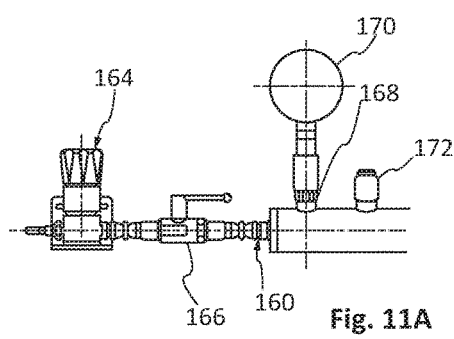
FIG. 11A is a side view of a first extremity of the line in FIG. 10.
Figure 11B:
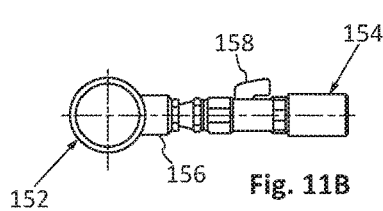
FIG. 11B is a side view of means for connecting to the line in FIG. 10.
Figure 11C:
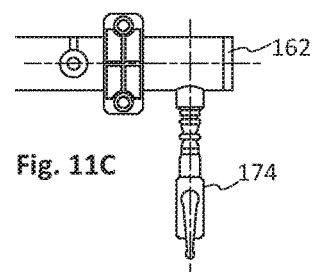
FIG. 11C is a side view of a second extremity of the line in FIG. 10.

According to an embodiment shown in FIGS. 10, 11A and 11C, the line 152 has a connection 160 at a first extremity to connect a pressurized gas supply and a stopper 162 at a second extremity.

Advantageously, the line 152 includes a reducing valve 164 linked to the connection 160 for connecting a pressurized gas supply. This reducing valve 164 enables the line 152 to be supplied with gas at a given pressure from a source supplying gas at a pressure above the given pressure. Preferably, a shutoff valve 166 is positioned between the connection 160 and the reducing valve 164. This shutoff valve 166 makes it possible to isolate the reducing valve 164 while the line is being supplied with gas via a quick-connect socket 154.

Preferably, the line 152 includes a connection plug 168 for connecting an appliance, for example a pressure sensor 170 and/or a safety valve 172 and/or a bleeder valve 174, shown in detail in FIG. 11C. According to one arrangement, the connection plug 168 and the safety valve 172 are positioned at the first extremity of the line 152 and the bleeder valve 174 is positioned at the second extremity.

The line 152 is attached by any appropriate means to a supporting element rigidly attached to the moveable chassis 102. Preferably, the mechanically welded structure of the moveable chassis 102 performs the supporting function. According to an embodiment, the line 152 is arranged in a vertical plane alongside the two vats 16, 16'. In parallel, each connection system 154 is arranged horizontally. This arrangement improves accessibility to the connection systems.

Advantageously, the line 152 follows an S-shaped path. It extends across the entire height of the mechanically welded structure of the moveable chassis 102.

The moveable shelf 118 and the line 152 are positioned on the moveable chassis 102 such that the moveable shelf 118 is positioned beneath the line 152.

Figure 12:
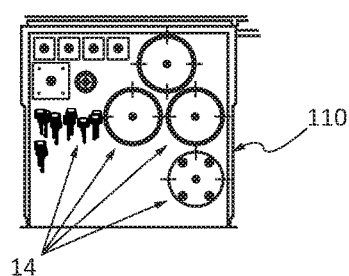
FIG. 12 is a top view of different connection interfaces stored in a drawer of the checking device in FIG. 1.

Advantageously, the checking device 10 has a plurality of interfaces 14 to link different testing tools 12' to a quick-connect socket 154, and they may be stored in one of the drawers 110 and 110', as shown in FIG. 12.

Figure 13:
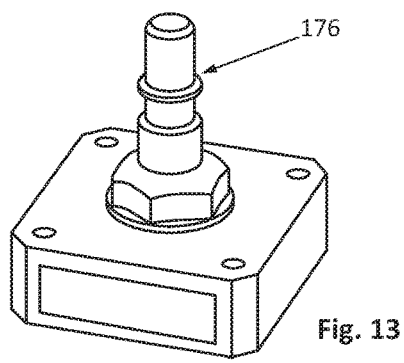
FIG. 13 is a perspective view of a plug common to all of the interfaces in FIG. 12.

Each interface 14 includes a quick-connect plug 176 (shown in FIG. 13) designed to be connected to a quick-connect socket 154. The quick-connect plugs 176 are identical in all of the interfaces.

Regardless of the embodiment, the device for checking a pressurized testing tool for a fluid circuit of an aircraft includes at least one tank 16, 16', 152 that includes at least one connection 88, 160 to connect a pressurized gas supply and at least one connection system 18, 154 arranged to connect at least one pressurized testing tool.

If the tank is in the form of a line 152, each connection system 154 is a quick-connect socket used to connect a testing tool to the line 152.

If the tank 16, 16' is a high-volume vat, the connection system has an opening 18 and a joining system 20 that are used to directly or indirectly link a testing tool to the tank 16, 16' via an interface 42.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for checking at least one pressurized testing tool for a fluid circuit of an aircraft, the device comprising:
at least one tank including at least one first connection to connect a pressurized gas supply and at least one second connection to connect to the at least one pressurized testing tool, the at least one pressurized testing tool being separate from the device; and
at least one connection system arranged to connect the at least one pressurized testing tool to the at least one tank,
wherein the connection system includes at least one opening enabling communication between the inside and the outside of the vat and a joining system configured to hold a closing element in a position in which the closing element closes the opening,
the device further comprising an interface including a wall traversed by a window the shape of which is adapted to the shape of the at least one pressurized testing tool to be checked, said wall having an internal face with a peripheral bearing surface configured to cooperate with a bearing surface of the opening.

2. The device according to claim 1, wherein the at least one tank is a vat with a capacity equal to or greater than 200 L.

3. The device according to claim 2, further comprising at least a second vat, each of the vat and the second vat having a connection and a connection pipe configured to link the two connections and to enable communication between at least the vat and the second vat.

4. The device according to claim 1, wherein the connection system includes:
an outer chamber delimited by a back and a peripheral wall having an edge corresponding to the bearing surface of the opening, and
a conduit for communicating the outer chamber with the inside of the vat.

5. The device according to claim 1, further comprising centering means to facilitate the positioning of an interface or of a door in relation to the opening.

6. The device according to claim 1, further comprising a false door for closing the opening.

7. The device according to claim 1, further comprising a second tank, the second tank being a line.

8. The device according to claim 7, wherein the internal diameter of the line is between 40 and 100 mm and/or the length of the line is between 3 and 10 m.

9. The device according to claim 7, wherein the line includes a reducing valve linked to the connection for connecting the pressurized gas supply.

10. The device according to claim 1, further comprising a moveable chassis carrying the at least one tank.

11. The device according to claim 10, wherein the moveable chassis includes a frame moveable between a blocking position in which at least one portion of the moveable frame is arranged opposite the connection system configured to connect at least one pressurized testing tool and a released position in which the moveable frame releases said connection system and enables placement of an interface, a false door, a pressurized testing tool, or any other closing element.

12. The device according to the claim 11, wherein the moveable frame includes two uprights, each having an aperture in which is seated a pivot axis carried by a static frame, at least one of the uprights having a hook configured to cooperate with a pin rigidly connected to the static frame in the blocking position.

13. The device according to claim 10, wherein the moveable chassis includes a moveable shelf positioned beneath a line acting as the tank.

14. The device according to claim 10, wherein the moveable chassis includes a structure surrounding the at least one tank in the form of a vat, a portion of which forms a supporting element to which the at least one tank in the form of a line is attached.

15. The device according to claim 14, wherein the supporting element is arranged vertically so that the line is arranged in a vertical plane.

16. The device according to claim 14, wherein the line follows an S-shaped path.

* * * * *